United States Patent Office 3,043,795
Patented July 10, 1962

3,043,795
TRANSPARENT THERMOPLASTIC COMPOSITIONS OF POLYVINYL CHLORIDE, COPOLYMERS OF ALKENYL AROMATIC HYDROCARBON AND ACRYLONITRILE, AND A MUTUALIZING AGENT AND METHOD OF MAKING THE SAME
Carleton W. Roberts, Midland, and Daniel H. Haigh, Beaverton, Mich., assignors to The Dow Chemical Company, Midland, Mich., a corporation of Delaware
No Drawing. Filed Mar. 27, 1959, Ser. No. 802,314
9 Claims. (Cl. 260—33.8)

This invention concerns new resinous compositions of matter comprising a predominate amount of polyvinyl chloride intimately incorporated with a minor proportion of a thermoplastic copolymer of an alkenyl aromatic hydrocarbon and acrylonitrile, and a mutualizing agent, and relates to a method for making the compositions.

It is known to incorporate a minor proportion of a rubbery copolymer of butadiene and acrylonitrile with polyvinyl chloride to produce compositions which are useful for a variety of purposes. However the relative softness and flexibility of such compositions restricts greatly their utility for many purposes for which they are otherwise well suited. Attempts to prepare rigid polyvinyl chloride compositions by incorporating normally hard thermoplastic polymers of alkenyl aromatic hydrocarbons with polyvinyl chloride have shown that the alkenyl aromatic hydrocarbon polymers are in general incompatible with polyvinyl chloride and form translucent to opaque plastic masses which are undesirable.

It has now been discovered that transparent resinous compositions comprising a predominant amount of polyvinyl chloride can readily be prepared by intimately incorporating with the polyvinyl chloride a minor proportion of a normally hard thermoplastic copolymer of an alkenyl aromatic hydrocarbon and acrylonitrile and a mutualizing agent as hereinafter defined.

The term "mutualizing agent" pertains to certain chemical compounds hereinafter defined which have an action of rendering the polymers compatible with, or soluble in, one another and said agent to produce transparent compositions.

The compositions possess good mechanical properties such as tensile strength, elongation, heat distortion temperature and rigidity and can readily be molded by usual compression or injection molding operations or by extrusion methods to produce articles suitable for a variety of purposes in the home and industry.

The polyvinyl chloride to be employed in the compositions can be any of the usual commercial grades of polyvinyl chloride having a molecular weight corresponding to a viscosity characteristic of from 1.1 to 2.5 centipoises as determined for a 2 weight percent solution of the polyvinyl chloride in ortho-chlorobenzene at 120° C.

The normally hard thermoplastic alkenyl aromatic hydrocarbon-acrylonitrile copolymer starting material can be a copolymer containing in chemically combined form from about 25 to 35 percent by weight of acrylonitrile and from 75 to 65 percent by weight of at least one monoalkenyl aromatic hydrocarbon of the benzene series such as styrene, vinyltoluene, vinylxylene, ar-ethylvinylbenzene, isopropylstyrene or tert.-butyl styrene. Such monoalkenyl aromatic hydrocarbons have the general formula:

$$Ar-CH=CH_2$$

wherein Ar represents an aromatic hydrocarbon radical of the benzene series.

The alkenyl aromatic hydrocarbon-acrylonitrile copolymer can be any normally solid copolymer of the aforementioned ingredients which copolymer has a molecular weight corresponding to a viscosity characteristic of from about 10 to 60 centipoises as determined for a 10 weight percent solution of the copolymer in methyl ethyl ketone at 25° C.

The polymeric ingredients can be employed in proportions of from about 80 to 95 percent by weight of the polyvinyl chloride and from about 20 to 5 percent by weight of the alkenyl aromatic hydrocarbon-acrylonitrile copolymer, based on the sum of the weights of the polymeric ingredients, but are preferably used in proportions of from 85 to 90 percent by weight of the polyvinyl chloride and from 15 to 10 percent of the alkenyl aromatic hydrocarbon-acrylonitrile copolymer.

The mutualizing agents which render the polymeric ingredients compatible with one another to produce transparent compositions are chemical compounds consisting of the addition reaction products or adducts of hexachlorocyclopentadiene and a vinyl aromatic compound of the benzene series such as styrene, vinyltoluene, vinylxylene, ar-ethylvinylbenzene, isopropylstyrene, tert.-butyl styrene, 2,4-dichlorostyrene, 2,5-dichlorostyrene, ar-chlorostyrene or divinylbenzene.

The adducts of hexachlorocyclopentadiene with monovinyl aromatic compounds have the general formula:

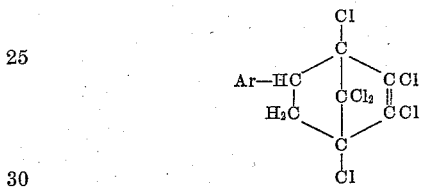

wherein Ar represents an aromatic radical of the group consisting of hydrocarbon and chlorohydrocarbon radicals of the benzene series. The adducts of hexachlorocyclopentadiene and divinylbenzene have the formula:

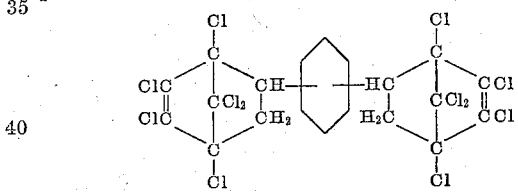

The adducts are preferably adducts of hexachlorocyclopentadiene with a mixture of isomeric meta- and para-divinylbenzenes or a monovinyl aromatic compound having the general formula:

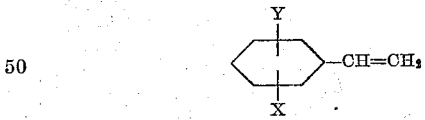

wherein X and Y each represent a member of the group consisting of hydrogen, chlorine and lower alkyl radicals containing from 1 to 4 carbon atoms. The adducts can be prepared by reacting hexachlorocyclopentadiene with the vinyl aromatic compounds by procedure similar to that decribed in U.S. application Serial No. 717,812, now U.S. Patent No. 2,952,711, filed February 27, 1958, by Carleton W. Roberts.

In brief, the adducts of hexachlorocyclopentadiene and the vinyl aromatic compounds can be prepared by reacting hexachlorocyclopentadiene with the vinyl aromatic compound at temperatures between 70° and 180° C., suitably at temperatures between 90° and 150° C., in an inert organic solvent such as benzene, toluene, xylene, ethylbenzene, chlorobenzene, ortho-dichlorobenzene, heptane, octane or petroleum ether, at atmospheric pressure or thereabout. The reaction is preferably carried out by dissolving the hexachlorocyclopentadiene in the organic solvent, e. g. heptane or toluene, heating the mixture to its refluxing temperature and thereafter adding the vinyl aromatic compound, preferably mixed with another portion of the organic solvent, to the refluxing mixture of the solvent and the hexachlorocyclopentadiene in proportions corresponding to approximately one gram molecular proportion of the hexachlorocyclopentadiene per gram equivalent vinyl radical, e.g. —CH=CH$_2$ group, in the vinyl aromatic compound, and at about the rate it is consumed in the reaction. The reaction is usually exothermic and proceeds rapidly. After adding the vinyl aromatic compound, the resulting mixture is usually refluxed or maintained at reaction temperatures between 70° and 180° C. for a period of from one to four hours or more to complete the reaction. The adduct product is recovered in usual ways, e.g. by crystallization or by distillation methods, depending upon whether the product is a crystalline or a liquid material.

A number of the adducts of hexachlorocyclopentadiene and the vinyl aromatic compounds employed as mutualizing agents in making the compositions of this invention are new chemical compounds, and are described and claimed in our copending application Serial No. 802,295, filed on even date herewith, now U.S. Patent No. 2,952,712.

The mutalizing agents, i.e. the adducts of hexachlorocyclopentadiene and the vinyl aromatic compounds herein specified, can be employed alone or as a mixture of any two or more of such adducts and in amounts corresponding to from about 5 to 20, preferably from 10 to 15, parts by weight of one or more of said adducts per 100 parts by weight of the sum of the weights of the polymeric ingredients.

The compositions are prepared by heat-plastifying and mechanically working the polymeric ingredients in admixture with one another in usual ways such as by compounding on heated rolls, in a Banbury mixer or a plastics extruder at temperatures between about 140° C. and 240° C. until a homogeneous and uniform composition is obtained. In general, compounding of the heat-plastified ingredients with one another at the above-mentioned temperatures for periods of from one to twenty minutes is satisfactory. The ingredients should not be compounded at the elevated temperatures for prolonged periods of time such as to result in deterioration or breakdown of the polymeric ingredients. It may be mentioned that when compounding the polymeric ingredients with one another and the mutualizing agent best results are usually obtained by first compounding or milling the acrylonitrile-alkenyl aromatic hydrocarbon copolymer with the mutualizing agent to obtain a uniform composition, and in the case of a crystalline mutualizing agent, at temperatures near or above the melting point of said agent, and thereafter adding the polyvinyl chloride, suitably as a powder or in molten form to the heat-plastified mass and milling or compounding the resulting mixture at heat-plastifying temperatures to blend the polymeric ingredients and the mutualizing agent into a uniform composition. The compostiion is cooled and cut or ground to a granular form suitable for molding.

The compositions of the invention consists essentially of the polyvinyl chloride, the alkenyl aromatic hydrocarbon-acrylonitrile preferably styrene-acrylonitrile, copolymer and the mutualizing agent in the proportions hereinbefore stated, but as is usual with polyvinyl chloride compositions, the compositions preferably contain a small amount, suitably from 1 to 5 percent by weight based on the weight of the composition, of a stabilizing agent intimately incorporated therewith. Suitable stabilizing agents are basic lead carbonate, lead ortho-silicate, cadmium stearate, cadmium laurate, cadmium octoate, cadmium ricinoleate, barium cadmium laurate, dibutyl tin mercaptide, cadmium 2-ethylhexoate, sodium ricinoleate and dibutyl tin S,S'-bis(3,5,5-trimethylhexylmercaptoacetate).

Other additives such as plasticizers, flow agents, mold release agents, dyes, pigments, or lubricants can be incorporated with the compositions, but are not required in the invention. Such additives, when used, are usually employed in amounts of from 0.5 to 20 percent by weight of the composition.

As previously mentioned, the new compositions are transparent resinous compositions possessing good mechanical properties and rigidity. They can be molded to form plastic articles such as sheet, film, rod, bars, tape, strips, boxes, cups, containers, etc., which are useful for a variety of purposes in the home and industry.

The following examples illustrate ways in which the principle of the invention has been applied, but are not to be construed as limiting its scope.

EXAMPLE 1

*Preparation of Adduct of Hexachlorocyclopentadiene and Divinylbenzene*

(A) A charge of 2727 grams (10 moles) of hexachlorocyclopentadiene and 5 liters of n-heptane was placed in a glass reaction vessel equipped with a reflux condenser and stirrer. The mixture was stirred and heated to its reflux temperature. Thereafter, 743 grams of a divinylbenzene fraction containing 75 percent by weight of a mixture of isomeric meta- and para-divnylbenzenes in proportions of about 65 percent by weight of the meta-divinylbenzene and 35 percent by weight of the para-divinylbenzene was added over a period of 1.5 hours. The resulting mixture was stirred and maintained at a refluxing temperature for a period of 35 hours, then was cooled to a temperature of 5° C., with stirring. A crystalline material separated from the liquid. The crystalline material was separated from the liquid by filtering and was washed with a small amount of n-heptane and was dried. There was obtained 2420 grams of a mixture of isomeric meta- and para-bis(1,4,5,6,7,7-hexachlorobicyclo[2.2.1]-5-hepten-2yl)benzenes as a white crystalline product melting at 175° C.

The mixture of isomeric meta- and para-bis(1,4,5,6,7,7-hexachlorobicyclo[2.2.1]-5-hepten-2yl)benzenes is usually obtained as a white crystalline product melting at a temperature between about 140° and 180° C. depending upon the relative proportions of the meta- and para-isomeric compounds in the mixture. The pure meta-bis(1,4,5,6,7,7-hexachlorobicyclo[2.2.1]-5-hepten-2yl)benzene has a melting point of about 210°–215° C., and the pure para-bis(1,4,5,6,7,7-hexachlorobicyclo[2.2.1] - 5 - hepten-2yl)-benzene melts at about 285°–295° C., but a mixture of the isomeric compounds melting at temperatures between 140° and 180° C. is advantageously employed in making the compositions of the invention.

(B) A charge of 50 grams of a resinous copolymer of 70 percent by weight of styrene and 30 percent of acrylonitrile, having a viscosity characteristic of 12 centipoises as determined for a 10 weight percent solution of the copolymer in methyl ethyl ketone at 25° C. was heat-plastified by milling the same on a pair of laboratory rolls at a temperature of 180° C. A charge of 50 grams of the crystalline adduct melting at 175° C., prepared above, was added and was intimately blended with the heated copolymer. Thereafter, 450 grams of polyvinyl chloride containing 3 percent by weight of dibutyl tin S,S'-bis(3,5,5-trimethylhexylmercaptoacetate) as stabilizer, was added. The resulting mixture was compounded on the rolls at a temperature of 180° C. for a period of 10 minutes to form a homogeneous composition, then was removed from the rolls, was allowed to cool to room temperature and was crushed to a granular form. Portions of the composition were injection molded to form test pieces of ½ x ⅛ inch cross section. These test pieces were used to determine the tensile strength and percent elongation for the product employing procedure similar to those described in ASTM D638–49T. Impact strength was determined by procedure similar to that described in ASTM D256–47T. Other molded test pieces were used to determine a heat distortion temperature for the composition employing a procedure similar to that of Heirholzer and Boyer, see ASTM Bull. No. 134 of May 1945. The composition had the properties:

ployed in making the same. In the table the term "bis-adduct" is employed to identify the reaction product of the hexachlorocyclopentadiene and the divinylbenzene for brevity.

TABLE I

| Run No. | Starting Materials | | | Product | | | | |
|---|---|---|---|---|---|---|---|---|
| | Polyvinyl Chloride, Parts by Weight | Copolymer, Parts by Weight | Bis-Adduct, percent | Tensile Strength, lbs./sq. in. | Elongation, percent | Notched Impact Strength, Ft.-lbs. | Heat Distortion Temp., °C. | Color |
| 1 | 90 | 10 | 5 | 9,050 | 64.8 | 0.52 | 76 | Clear. |
| 2 | 90 | 10 | 10 | 9,500 | 58.4 | 0.53 | 42 | Do. |
| 3 | 90 | 10 | 15 | 9,520 | 62.1 | 0.56 | 73 | Do. |
| 4 | 85 | 15 | 5 | 9,920 | 83.7 | 0.53 | 73 | Do. |
| 5 | 85 | 15 | 10 | 9,700 | 46.2 | 0.54 | 80 | Do. |
| 6 | 85 | 15 | 15 | 9,690 | 101.9 | 0.53 | 73 | Do. |

Tensile strength _____ 9,500 lbs./sq. in.
Elongation _____ 58.4 percent.
Notched impact strength_____ 0.53 ft.-lbs.
Heat distortion temperature_____ 72° C.
Color _____ Transparent.

In contrast, a composition prepared from 45 parts by weight of a copolymer of 81 percent by weight of styrene and 19 percent of acrylonitrile, 455 parts of stabilized polyvinyl chloride and 57.5 parts of the adduct melting at 175° C. as mutualizing agent, was an opaque product having an elongation of only 23.9 percent.

EXAMPLE 2

A charge of 400 grams of stabilized polyvinyl chloride, 100 grams of a resinous copolymer of 70 percent by weight of styrene and 30 percent of acrylonitrile and 100 grams of the adduct of hexachlorocyclopentadiene and divinylbenzene melting at 175° C. as mutualizing agent, was compounded into a uniform composition by procedure similar to that employed in Example 1. The composition had the properties:

Tensile strength _____ 9,930 lbs./sq. in.
Elongation _____ 101.9 percent.
Notched impact strength_____ 0.56 ft.-lbs.
Heat distortion temperature_____ 75° C.
Color _____ Transparent.

EXAMPLE 4

In each of a series of experiments, a charge of a copolymer of 70 percent by weight of styrene and 30 percent of acrylonitrile and 1,2,3,4,7,7-hexachloro-6-(4-tert.-butylphenyl)-bicyclo[2.2.1]hept-2-ene, i.e. the adduct of 4-tert.-butylstyrene and hexachlorocyclopentadiene, prepared by procedure similar to that described in Example 1 for making the adduct of hexachlorocyclopentadiene and divinylbenzene, a white crystalline material melting at 103.5°–104° C., in proportions as stated in the following table was milled together on compounding rolls at a temperature of 180° C. Thereafter, the mixture was blended with polyvinyl chloride containing 3 percent by weight of dibutyl tin S,S'-bis(3,5,5-trimethylhexylmercapto acetate), as stabilizer, in amount as stated in the table by milling the ingredients on the heated rolls at a temperature of 180° C. for a period of 10 minutes to form a homogeneous composition. The product was injection molded to form test pieces. These test pieces were used to determine the properties for the composition employing procedures similar to those employed in Example 1. Table II identifies the compositions by giving proportions of the ingredients used in preparing the same, and gives the properties determined for the products.

TABLE II

| Run No. | Starting Materials | | | Product | | | | |
|---|---|---|---|---|---|---|---|---|
| | Polyvinyl Chloride, Parts by Weight | Copolymer, Parts by Weight | Adduct, percent | Tensile Strength, lbs./sq. in. | Elongation, percent | Notched Impact Strength, Ft.-lbs. | Heat Distortion Temp., °C. | Color |
| 1 | 95 | 5 | 10 | 9,700 | 38.1 | 0.53 | 72 | clear. |
| 2 | 90 | 10 | 10 | 9,740 | 35.9 | 0.36 | 74 | Do. |
| 3 | 85 | 15 | 10 | 9,830 | 52.3 | 0.37 | 74 | Do. |
| 4 | 80 | 20 | 10 | 9,750 | 82.3 | 0.40 | 77 | Do. |

EXAMPLE 3

In each of a series of experiments, a charge of a copolymer of 70 percent by weight of styrene and 30 percent of acrylonitrile, and an amount of the adduct of hexachlorocyclopentadiene and divinylbenzene melting at 175° C. as stated in the following table was compounded with a charge of the stabilized polyvinyl chloride, employing a procedure similar to that employed in Example 1, to form a homogeneous composition of the ingredients in proportions as stated in the following table. The compositions were tested employing procedures similar to those employed in Example 1. All of the compositions formed transparent moldings. Table I identifies the compositions by giving the proportions of the ingredients em-

EXAMPLE 5

In each of a series of experiments, a charge of 100 grams of a copolymer of 70 percent by weight of styrene and 30 percent of acrylonitrile having a viscosity characteristic of 11 centipoises as determined for a 10 weight percent solution of the copolymer in methyl ethyl ketone at 25° C. was milled on compounding rolls at a temperature of 180° C. for a period of 6 minutes, together with an amount of the adduct of 4-tert.-butylstyrene and hexachlorocyclopentadiene melting at 103.5°–104° C., as stated in the following table. A charge of 400 grams of polyvinyl chloride containing 3 percent by weight of dibutyl tin S,S'-bis(3,5,5-trimethylhexylmercapto acetate) as stabilizer was added. The resulting mixture was compounded on the rolls at a temperature of 180° C. for a period of 10 minutes to form a homogeneous composition. The composition was molded and tested employing procedures similar to those employed in Example 1. Table III identifies the compositions and gives the properties determined for the product.

TABLE III

| Run No. | Starting Materials | | | Product | | | | |
|---|---|---|---|---|---|---|---|---|
| | Polyvinyl Chloride, Parts by Weight | Copolymer, Parts by Weight | Adduct, percent | Tensile Strength, lbs./sq. in. | Elongation, percent | Notched Impact Strength, Ft.-lbs. | Heat Distortion Temp., °C. | Color |
| 1 | 80 | 20 | 0 | 7,350 | 121.3 | 0.34 | 83 | opaque. |
| 2 | 80 | 20 | 5 | 8,000 | 134.5 | 0.48 | 79 | clear. |
| 3 | 80 | 20 | 10 | 8,820 | 144.0 | 0.35 | 76 | Do. |
| 4 | 80 | 20 | 15 | 9,650 | 74.8 | 0.35 | 73 | Do. |

EXAMPLE 6

In each of a series of experiments, a charge of 55 grams of a resinous copolymer of 70 percent by weight of styrene and 30 percent of acrylonitrile having a viscosity characteristic of 11 centipoises as determined for a 10 weight percent solution of the copolymer in methyl ethyl ketone at 25° C. was heat-plastified by milling the same on a pair of laboratory compounding rolls at a temperature of 180° C. The heat-softened copolymer was then compounded with 55 grams of an adduct of hexachlorocyclopentadiene and a monovinyl aromatic compound as identified in the following table. Thereafter, 445 grams of polyvinyl chloride containing 3 percent by weight of dibutyl tin S,S'-bis(3,5,5-trimethylhexylmercapto acetate) as stabilizer was added. The resulting mixture was milled on the rolls at a temperature of 180° C. for a period of 10 minutes, then was removed from the rolls, was allowed to cool to room temperature and was crushed to a granular form. Portions of the composition were molded to form test pieces. The properties for the composition were determined employing procedures similar to those employed in Example 1. Table IV identifies the experiments and names the monovinyl aromatic compound which was reacted with the hexachlorocyclopentadiene to form the adduct employed as mutualizing agent in said experiment. The table also gives the properties determined for the composition.

The adducts employed in the experiments were prepared by reacting hexachlorocyclopentadiene with the monovinyl aromatic compounds employing procedure similar to that described in Example 1, and separating the product from the reacted mixture in usual ways, e.g. by crystallization or distillation methods. The adducts were chemical compounds characterized as follows:

(1) A mixture of isomeric 1,2,3,4,7,7-hexachloro-6-meta- and para-tolylbicyclo[2.2.1]hept-2-ene, a colorless liquid boiling at 163.5° C. at 0.8 millimeter absolute pressure having a refractive index $N_D^{25}$ 1.5828 and containing 54.25 percent by weight of chlorine by analysis.

(2) A mixture of isomeric 1,2,3,4,7,7-hexachloro-6-(meta- and para-ethylphenyl)bicyclo[2.2.1]hept-2-ene, a colorless liquid boiling at 194° C. at 2.2 millimeters absolute pressure having a refractive index $N_D^{25}$ 1.5750 and containing 52.42 percent by weight of chlorine by analysis.

(3) 1,2,3,4,7,7 - hexachloro - 6 - (2,4 - dichlorophenyl) bicyclo[2.2.1]hept-2-ene, a white crystalline material melting at 127°–128° C. and containing 63.13 percent by weight of chlorine by analysis.

(4) 1,2,3,4,7,7 - hexachloro - 6 - (4 - tert. - butylphenyl)bicyclo[2.2.1]hept-2-ene, a white crystalline material melting at 103.5°–104° C. and containing 48.87 percent by weight of chlorine by analysis.

(5) 1,2,3,4,7,7 - hexachloro - 6 - phenyl bicyclo[2.2.1]-hept-2-ene, a white crystalline material melting at 73°–76° C. and containing 57.9 percent of chlorine by analysis.

Similar results are obtained by substituting the adduct of hexachlorocyclopentadiene with vinylxylene, isopropylstyrene, ar-ethylchlorostyrene, ar-chlorovinyltoluene, ar-chlorostyrene or ar-isopropylchlorostyrene, for the adducts employed in the experiments.

We claim:

1. A composition of matter comprising from 5 to 20 percent by weight of a resinous thermoplastic copolymer of from 65 to 75 percent by weight of at least one alkenyl aromatic hydrocarbon having the general formula Ar—CH=CH$_2$ wherein Ar represents an aromatic hydrocarbon radical of the benzene series, and from 35 to 25 percent of acrylonitrile, intimately incorporated with from 95 to 80 percent by weight of polyvinyl chloride, and with from 5 to 20 percent, based on the sum of the weights of the polymeric ingredients, of an adduct of hexachlorocyclopentadiene and a vinyl aromatic compound selected from the group consisting of divinylbenzene, monovinyl aromatic hydrocarbons of the benzene series and nuclear chlorinated monovinyl aromatic hydrocarbons of the benzene series.

2. A composition of matter comprising from 5 to 20 percent by weight of a resinous thermoplastic copolymer of from 65 to 75 percent by weight of styrene and from 35 to 25 percent of acrylonitrile intimately incorporated

TABLE IV

| Run No. | Mutualizing Agent | Product | | | | |
|---|---|---|---|---|---|---|
| | Adduct of Hexachlorocyclopentadiene with— | Tensile Strength, lbs./sq. in. | Elongation, Percent | Notched Impact Strength, ft.-lbs. | Heat Distortion Temp., °C. | Color |
| 1 | Mixture of meta- and para-vinyltoluenes. | 9,975 | 34.5 | 0.32 | 66 | clear. |
| 2 | Mixture of meta- and para-ethylvinylbenzenes. | 9,550 | 31.2 | 0.40 | 64 | Do. |
| 3 | 2,4-dichlorostyrene | 9,475 | 45.3 | 0.36 | 66 | Do. |
| 4 | 4-tert.-butyl styrene | 10,100 | 36.1 | 0.38 | 68 | Do. |
| 5 | Styrene | 9,640 | 32.5 | 0.40 | 67 | Do. | with from 95 to 80 percent by weight of polyvinyl chloride, and with from 5 to 20 percent based on the sum of the weights of the polymeric ingredients, of a mutualizing agent consisting of an adduct of hexachlorocyclopentadiene with a vinyl aromatic compound selected from the group consisting of divinylbenzene, monovinyl aromatic hydrocarbons of the benzene series and nuclear chlorinated monovinyl aromatic hydrocarbons of the benzene series.

3. A composition as claimed in claim 2, wherein the adduct is an adduct of hexachlorocyclopentadiene and 4-tert.-butylstyrene.

4. A composition as claimed in claim 2, wherein the adduct is an adduct of hexachlorocyclopentadiene and a mixture of meta- and para-divinylbenzenes, which adduct has a melting point between 150° and 180° C.

5. A composition as claimed in claim 2, wherein the adduct is an adduct of hexachlorocyclopentadiene and vinyltoluene.

6. A composition as claimed in claim 2, wherein the adduct is an adduct of hexachlorocyclopentadiene and a mixture of meta- and para-ethylvinylbenzenes.

7. A composition as claimed in claim 2, wherein the adduct is an adduct of hexachlorocyclopentadiene and 2,4-dichlorostyrene.

8. A composition as claimed in claim 2, wherein the adduct is an adduct of hexachlorocyclopentadiene and styrene.

9. A method of making a transparent composition of matter which comprises heat-plastifying a resinous thermoplastic copolymer of from 65 to 75 percent by weight of an alkenyl aromatic hydrocarbon having the general formula Ar—CH=CH$_2$ wherein Ar represents an aromatic hydrocarbon radical of the benzene series, and from 35 to 25 percent of acrylonitrile at temperatures between 140° and 240° C. and intimately incorporating with the heat-softened copolymer an adduct of hexachlorocyclopentadiene and a vinyl aromatic compound selected from the group consisting of divinylbenzene, monovinyl aromatic hydrocarbons of the benzene series and nuclear chlorinated monovinyl aromatic hydrocarbons of the benzene series, then intimately incorporating the resulting mixture with polyvinyl chloride at temperatures between 160° and 240° C. to form a homogeneous composition, said polymeric ingredients being in proportions of from 5 to 20 percent by weight of the copolymer of the alkenyl aromatic hydrocarbon and acrylonitrile and from 95 to 80 percent of the polyvinyl chloride and said adduct being in amounts of from 5 to 20 percent, based on the sum of the weights of the polymeric ingredients.

References Cited in the file of this patent

UNITED STATES PATENTS

| | | |
|---|---|---|
| 2,606,910 | Herzfeld et al. | Aug. 12, 1952 |
| 2,646,417 | Jennings | July 21, 1953 |
| 2,902,460 | Jennings et al. | Sept. 1, 1959 |
| 2,952,711 | Roberts | Sept. 13, 1960 |
| 2,952,712 | Roberts et al. | Sept. 13, 1960 |